(12) United States Patent
Knopf et al.

(10) Patent No.: US 10,962,086 B2
(45) Date of Patent: Mar. 30, 2021

(54) VISCOSITY-TORSIONAL VIBRATION DAMPER OR ABSORBER FOR A CRANKSHAFT OF A COMBUSTION ENGINE

(71) Applicant: Hasse & Wrede GmbH, Berlin (DE)

(72) Inventors: Florian Knopf, Berlin (DE); Michael Steidl, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 0 days.

(21) Appl. No.: 16/637,966

(22) PCT Filed: Aug. 6, 2018

(86) PCT No.: PCT/EP2018/071270
§ 371 (c)(1),
(2) Date: Feb. 10, 2020

(87) PCT Pub. No.: WO2019/030174
PCT Pub. Date: Feb. 14, 2019

(65) Prior Publication Data
US 2020/0208713 A1  Jul. 2, 2020

(30) Foreign Application Priority Data
Aug. 10, 2017  (DE) .................. 10 2017 118 265.9

(51) Int. Cl.
*F16F 15/173* (2006.01)
*F16F 15/14* (2006.01)
(Continued)

(52) U.S. Cl.
CPC .......... *F16F 15/173* (2013.01); *F16F 15/145* (2013.01); *F16F 15/126* (2013.01);
(Continued)

(58) Field of Classification Search
CPC ...... F16F 15/173; F16F 15/145; F16F 15/126; F16H 55/36; F16H 2045/0221; F16H 2055/366
(Continued)

(56) References Cited

U.S. PATENT DOCUMENTS

| 2009/0255368 A1* | 10/2009 | Kiener | F16F 15/1442 74/573.12 |
| 2011/0048877 A1* | 3/2011 | Geislinger | F16F 15/173 188/277 |
| 2019/0024751 A1* | 1/2019 | Dohi | F16F 15/134 |

FOREIGN PATENT DOCUMENTS

DE  970 876 C  11/1958
DE  197 40 685 A1  3/1999
(Continued)

OTHER PUBLICATIONS

International Search Report (PCT/ISA/210) issued in PCT Application No. PCT/EP2018/071270 dated Nov. 22, 2018 with English translation (five pages).
(Continued)

*Primary Examiner* — Joseph J Dallo
*Assistant Examiner* — Yi-Kai Wang
(74) *Attorney, Agent, or Firm* — Crowell & Moring LLP

(57) ABSTRACT

A viscosity-torsional vibration damper or absorber for a crankshaft of a combustion engine includes an annular damping or absorbing arrangement which can be fastened to the crankshaft. The damping or absorbing arrangement is fastened in an outer diameter region to a holding device which, on the other hand, can be fastened to the crankshaft and can be sprung in the axial direction of the crankshaft, but is inherently rigid radially with respect to the crankshaft.

9 Claims, 5 Drawing Sheets

(51) Int. Cl.
*F16F 15/126* (2006.01)
*F16H 55/36* (2006.01)
*F16H 45/02* (2006.01)

(52) U.S. Cl.
CPC ...... *F16H 55/36* (2013.01); *F16H 2045/0221* (2013.01); *F16H 2055/366* (2013.01)

(58) Field of Classification Search
USPC ..................................................... 123/192.1
See application file for complete search history.

(56) References Cited

FOREIGN PATENT DOCUMENTS

| DE | 100 37 680 A1 | 2/2002 | | |
|---|---|---|---|---|
| DE | 103 48 725 A1 | 5/2005 | | |
| DE | 197 40 685 B4 | 11/2005 | | |
| DE | 10 2005 022 750 A1 | 11/2006 | | |
| DE | 102 38 605 B4 | 3/2007 | | |
| EP | 1 288 527 A1 | 3/2003 | | |
| EP | 1288527 A1 | * 3/2003 | .......... | F16F 15/1201 |
| EP | 1 288 527 B1 | 2/2006 | | |
| WO | WO 2005/038293 A1 | 4/2005 | | |

OTHER PUBLICATIONS

German-language Written Opinion (PCT/ISA/237) issued in PCT Application No. PCT/EP2018/071270 dated Nov. 22, 2018 (five pages).
German-language Office Action issued in counterpart German Application No. 10 2017 118 265.9 dated Mar. 16, 2018 (seven pages).
International Preliminary Report on Patentability (PCT/IB/326 & PCT/IB/373) issued in PCT Application No. PCT/EP2018/071270 dated Feb. 20, 2020, including English translation of document C2 (Japanese-language Written Opinion (PCT/ISA/237) previously filed on Feb. 10, 2020) (seven (7) pages).

* cited by examiner

VISCOSITY-TORSIONAL VIBRATION DAMPER OR ABSORBER FOR A CRANKSHAFT OF A COMBUSTION ENGINE

BACKGROUND AND SUMMARY OF THE INVENTION

The present invention relates to a viscosity-torsional vibration damper or absorber for a crankshaft of an internal combustion engine, with a ring-like damping or absorbing arrangement which can be fastened on the crankshaft.

Viscosity-torsional vibration dampers or absorbers of the generic type are known in a wide range of embodiments.

Such torsional vibration dampers or absorbers are used to reduce the effect of torsional vibrations.

In modern engine manufacturing, increasingly higher gas pressures are produced in the cylinders in order to improve efficiency and comply with the relevant exhaust gas standards, moreover reductions in the crankshaft dimensions are produced to achieve a lightweight design and weight saving.

This combination of more pronounced vibration generation and more flexible, lighter systems which are capable of vibrating leads to ever more critical vibrational properties of the crankshafts. This applies both to torsional vibrations and also to axial vibrations and bending vibrations of the crankshafts.

The torsional vibrations can be reduced by increasingly efficient torsional vibration dampers or absorbers.

Damping is the conversion of movement energy (kinetic energy) into forms of energy which are ineffective for the considered system which is capable of vibrating. The dampers perform a conversion of kinetic energy into heat as a result of internal or external friction processes. Damping is therefore energy dissipation. Damping brings about a reduction in the resonances of a system and does not reduce the rotational irregularity of a system capable of torsional vibration. One example is the viscosity-torsional vibration damper. In contrast, the principle of vibration absorption is based on a concentration of inertial force—the absorber mass vibrates in phase opposition to the exciting force. The number of degrees of system freedom is increased by at least one by an absorber additionally fitted on a system which is capable of vibration. Absorber adjustment can be performed in various ways depending on requirements.

Axial and bending vibrations are in practice not yet taken into account in the case of the hitherto known constructions of torsional vibration dampers or absorbers.

The axial and bending vibrations of the crankshaft are transmitted via a torsional vibration damper or absorber which can be fastened, for example, via a flange on the crankshaft and have the following negative effects:

On one hand, tensions are caused at the damper flange and at the housing of the torsional vibration damper or absorber, which was hitherto prevented by expensive and heavy larger wall thicknesses.

In the case of viscosity-torsional vibration dampers or absorbers, the tensions can also lead to increased wear of the bearing of the flywheel in the housing, moreover a reduced efficiency of the torsional vibration damping or absorption can also arise as a result of superimposition with the torsional vibrations.

The object on which the present invention is based is to largely avoid the above-mentioned disadvantages of a viscosity-torsional vibration damper or absorber.

This object is achieved in that the damping or absorption arrangement is arranged, in particular fastened, in an outer diameter region on a holding apparatus, which on the other hand can be arranged, in particular fastened, on the crankshaft and which is formed to be capable of being sprung in the axial direction of the crankshaft, but inherently rigid radially with respect to the crankshaft. The invention furthermore relates to a crankshaft with such a damping or absorption arrangement.

As a result of this, it is achieved that potentially occurring axial vibrations are largely isolated, while torsional vibrations are damped as before by the action.

According to one preferred variant, the damping or absorption arrangement can have a ring-like housing which can be fastened on the crankshaft with a flywheel which is mounted rotatably therein in a silicon oil or the like relative to the housing.

As a result of this, it is achieved that potentially occurring axial vibrations are largely isolated, while torsional vibrations are damped as before by the action.

It is expedient if the housing is fastened on at least one end surface and in its outer diameter region on one holding apparatus which on the other hand can be fastened on the crankshaft and is capable of being sprung in the axial direction of the crankshaft, but is formed to be inherently rigid radially with respect to the crankshaft.

As a result of this, it is achieved that potentially occurring axial vibrations are largely isolated, but torsional vibrations are damped as previously by the action.

One advantageous further development of the invention provides that the housing is fastened on both end surfaces on in each case one of the holding apparatuses which project in the direction of the crankshaft beyond the housing and in this protruding region are connected to one another by a spacer sleeve and can overall be fixed on the crankshaft.

This construction has in particular the advantage that the damper housing, as is already known in many other applications, can act as a belt pulley and the bending moment introduced by the belt can be taken up by the two holding apparatuses without deformation.

Further advantageous features of the invention are the subject matter of further subordinate claims.

Exemplary embodiments of the invention are represented in the enclosed drawings and are described in greater detail below.

DETAILED DESCRIPTION OF THE DRAWINGS

Figure 1:
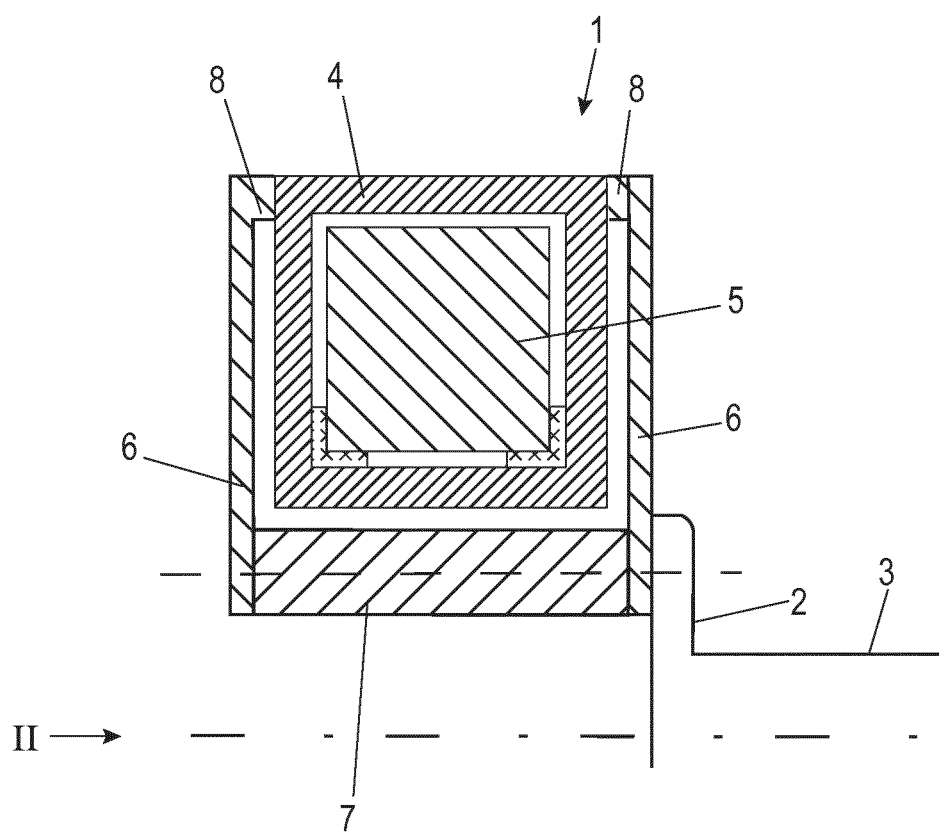
FIG. 1 shows a partial section through a viscosity-torsional vibration damper according to the invention.

In FIG. 1, the reference number 1 designates overall a viscosity-torsional vibration damper which can be fixed on a flange 2 of a crankshaft 3 of an internal combustion engine. The following statements can be applied in an analogous manner to viscosity-torsional vibration absorbers.

Viscosity-torsional vibration damper 1 of FIG. 1 comprises, as a ring-like damping or absorbing arrangement in a preferred configuration, a ring-like housing 4 with a flywheel 5 mounted rotatably therein in a viscous medium such as a silicon oil or the like.

Here, it further comprises two holding apparatuses 6 which are fastened on the one hand on opposite end surfaces of housing 4 and on the other hand on a spacer sleeve 7, wherein both holding apparatuses 6 can be fixed jointly with spacer sleeve 7 on flange 2 of a crankshaft 3. The connection of holding apparatuses 6 to housing 4 is performed in the outer diameter region of housing 4. Here, holding apparatuses 6 can further in a preferred configuration be held in each case via spacers or spacer rings 8 at a distance to the end surfaces of housing 4.

Holding apparatuses 6 are configured in such a manner that these holding apparatuses are formed to be inherently rigid radially with respect to crankshaft 3 and are configured to be capable of being sprung in the axial direction of crankshaft 3.

As FIG. 1 clearly shows, holding apparatuses 6 project in the direction of crankshaft 3 beyond housing 4 and are fastened in this region with spacer sleeve 7 and flange 2 of crankshaft 3.

Due to the fact that holding apparatuses 6 are formed to be capable of being axially sprung, it is possible to effectively damp or absorb axial vibrations of crankshaft 3 which occur during operation.

Since holding apparatuses 6 are in contrast formed to be inherently rigid in the direction running radially with respect to crankshaft 3, the action of viscosity-torsional vibration damper or absorber 1 in the circumferential direction is not impaired.

The exemplary embodiment of the invention represented in FIG. 1 with two holding apparatuses 6 on both end sides of housing 4 has the advantage that housing 4 can where necessary also act as a belt pulley since the bending moment introduced by the belt can be taken up by both holding apparatuses 6 without deformation.

If, however, the use of viscosity-torsional vibration damper or absorber 1 without the use of a belt is intended, a single holding apparatus 6 on an axial end side of housing 4 is also sufficient.

Figure 2:
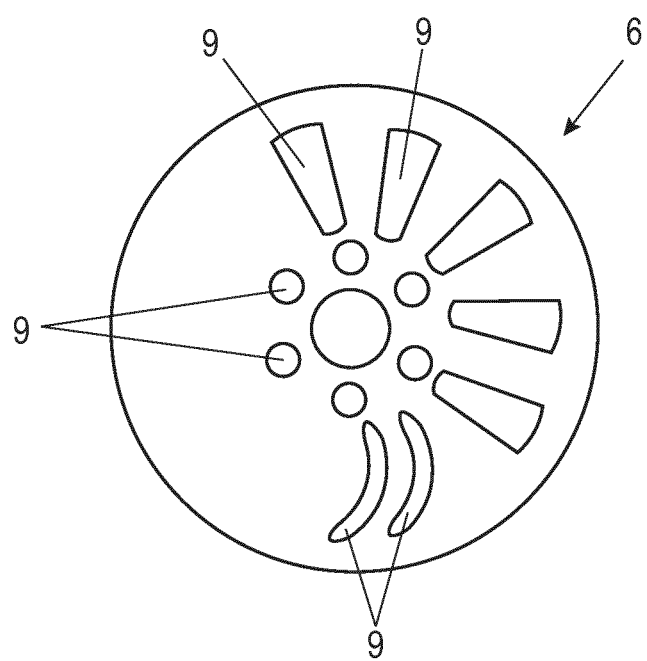
FIG. 2 shows a schematically represented view in the direction of arrow II in FIG. 1 with alternative configurations of a holding apparatus for a housing of the viscosity-torsional vibration damper from FIG. 1.

Holding apparatuses 6 can advantageously be formed from annular connecting disks. These annular connecting discs can, as FIG. 2 very clearly shows, be broken through with openings 9 of various graphic configurations in order to set a desired capability to be sprung axially with respect to crankshaft 3.

It is thus possible to attach circular, sector-shaped or sickle-shaped openings 9 in order to achieve a desired capacity to be axially sprung of holding apparatuses 6.

Figure 3:
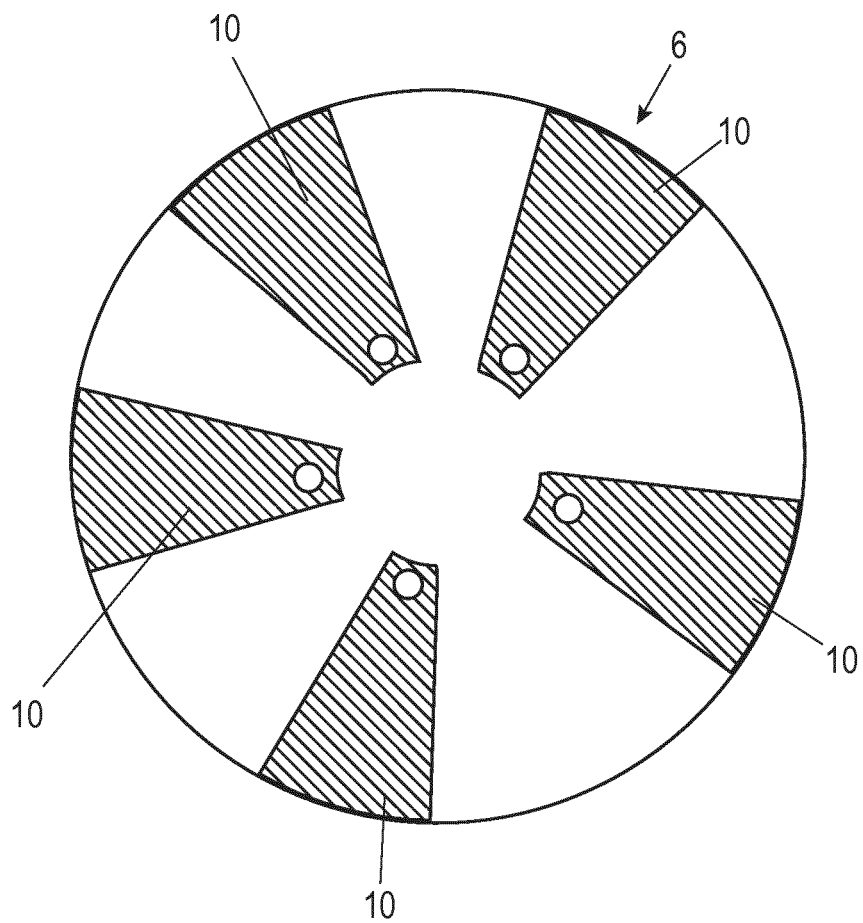
FIG. 3 shows a further exemplary embodiment for a holding apparatus of a housing of a viscosity-torsional vibration damper.
Figure 4:
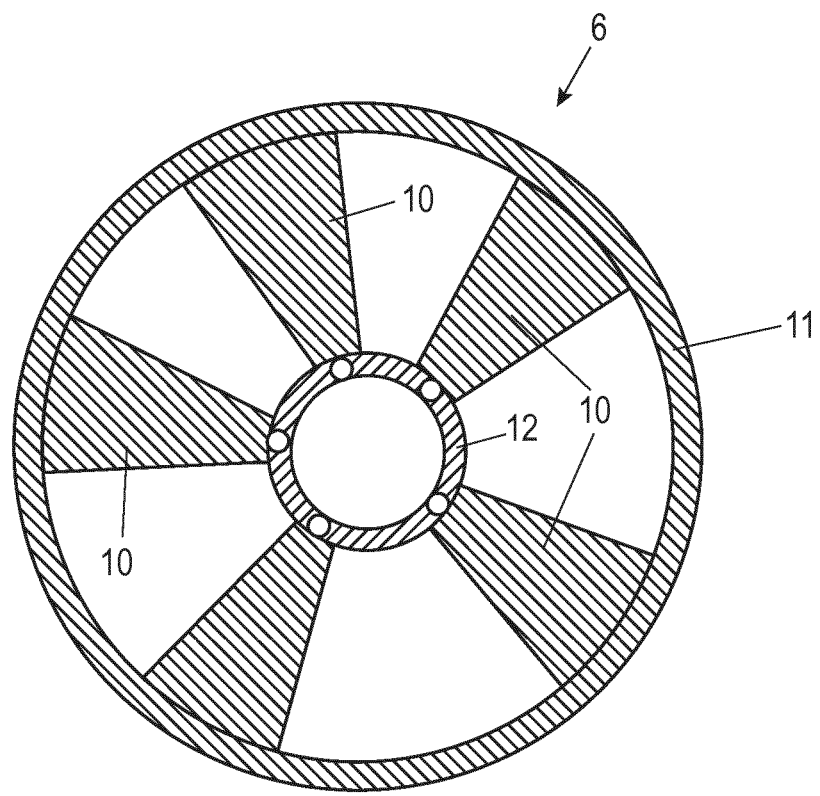
FIG. 4 shows a further holding apparatus for a housing of a torsional vibration damper.

As FIGS. 3 and 4 make clear, holding apparatuses 6 can, however, also be formed from several sector-shaped struts 10 which are fastened at their outer ends on a ring 11 and in the central region on a sleeve 12, as a result of which a fully manufacturable mounting unit is formed. It is, however, also conceivable, as FIG. 3 shows, that sector-like struts 10 are fixed in their outer edge region directly with housing 4 and centrally on a spacer sleeve 7 as in the case of the exemplary embodiment according to FIG. 1.

Figure 5:
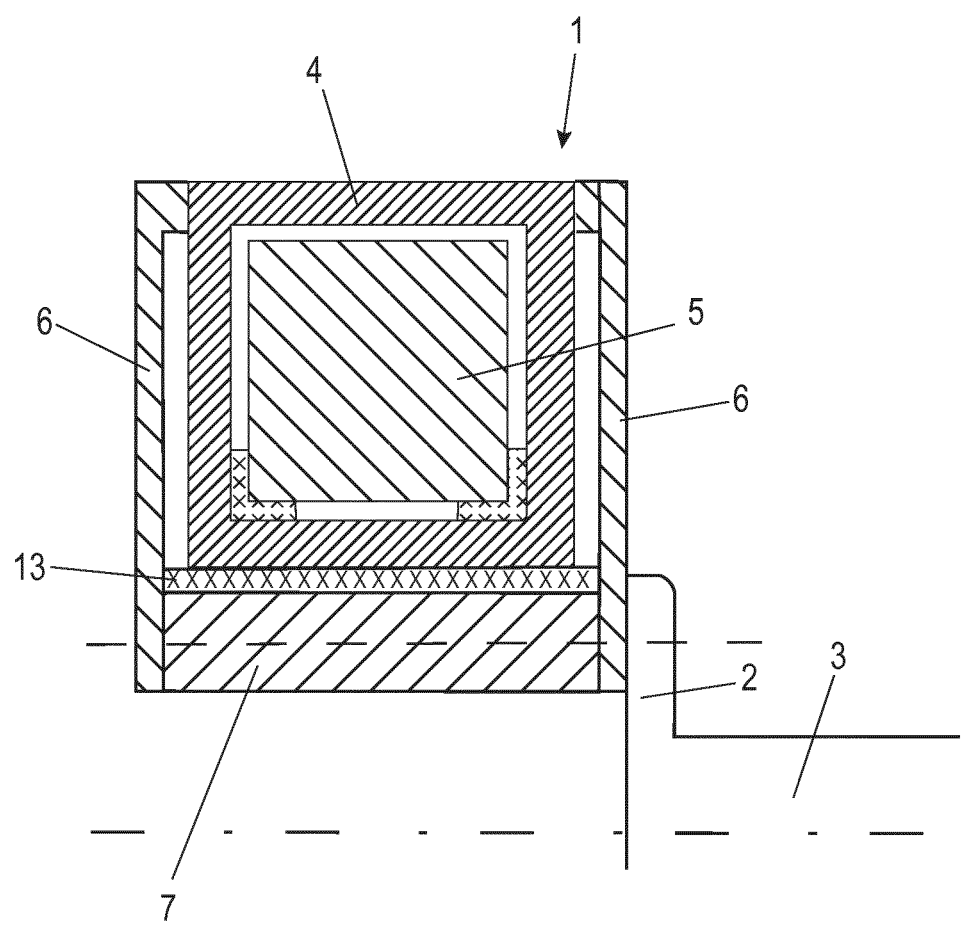
FIG. 5 shows a partial section corresponding to FIG. 1 through a further exemplary embodiment of the invention.

The exemplary embodiment of the invention represented in FIG. 5 shows that a damping element which acts in particular in the axial direction and can have, for example, the form of a ring 13 is arranged between housing 4 and spacer sleeve 7, wherein this damping element reaches at the end sides to both holding apparatuses 6. As a result of this vibration-isolated fastening of the damper on crankshaft 3, the axial resonant frequencies of the crankshaft-damper system are increased (up to the frequency of the vibration isolation). This can be advantageous since as a result of this the resonant frequencies are simultaneously increased and in the most expedient case these resonances then lie outside the excitation spectrum.

As a result of the additional damping shown here between damper housing 4 and crankshaft flange 2, in the case of which ring 13 is composed, for example, from an elastomer, not only is the vibration isolation damped, but also all the axial resonant frequencies, as a result of which viscosity-torsional vibration damper 1 then takes on the additional function of a seismic axial vibration damper. The adjustment of the "torsional vibration damping" function is entirely independent of the function "axial vibration damping" in this case.

LIST OF REFERENCE NUMBERS

1 Viscosity-torsional vibration damper
2 Flange
3 Crankshaft
4 Housing
5 Flywheel
6 Holding apparatus
7 Spacer sleeve
8 Spacer ring
9 Opening
10 Strut
11 Ring
12 Sleeve
13 Ring

What is claimed is:

1. A viscosity-torsional vibration damper or absorber for a crankshaft of an internal combustion engine, comprising:
   a ring-shaped damping or absorption arrangement which is fastenable on the crankshaft, wherein
   the damping or absorption arrangement is arranged in an outer diameter region on a holding apparatus, which on the other hand is arrangeable, on the crankshaft and which is formed to be capable of being sprung in an axial direction of the crankshaft, but inherently rigid radially with respect to the crankshaft,
   the damping or absorption arrangement has a ring-shaped housing which is fastenable on the crankshaft with a flywheel which is mounted rotatably therein in a silicon oil relative to the housing,
   the ring-shaped housing is fastened in an outer diameter region on an end surface or on both end surfaces on two of the holding apparatuses which project in the direction of the crankshaft beyond the housing, and
   the two holding apparatuses are fastened on two opposite end surfaces of the ring-shaped housing and protrude in the direction of the crankshaft beyond the ring-shaped housing, and in said protruding region are connected to one another by a spacer sleeve,
   wherein the two holding apparatus are configured to be inherently rigid radially relative to the crankshaft and configured to be capable of being sprung in the axial direction of the crankshaft, and overall the arrangement with the two holding elements is fixable on the crankshaft.

2. The viscosity-torsional vibration damper or absorber as claimed in claim 1, wherein
   the holding apparatuses are formed from an annular connecting disk.

3. The viscosity-torsional vibration damper or absorber as claimed in claim 1, wherein
the holding apparatuses is or are composed in each case from several sector-shaped struts.

4. The viscosity-torsional vibration damper or absorber as claimed in claim 3, wherein
the connecting discs or the struts are provided with axial openings.

5. The viscosity-torsional vibration damper or absorber as claimed in claim 4, wherein
the openings are formed to be circular, arc-shaped and/or sector-shaped.

6. The viscosity-torsional vibration damper or absorber as claimed in claim 1, wherein
a damping element, which acts in the axial direction, is arranged between the spacer sleeve and the housing.

7. The viscosity-torsional vibration damper or absorber as claimed in claim 6, wherein the damping element is composed of a ring which is supported at the end side on both holding apparatuses.

8. The viscosity-torsional vibration damper or absorber as claimed in claim 7, wherein the ring is produced from an elastomer.

9. A crankshaft, comprising a viscosity-torsional vibration damper according to claim 1, the damper or absorber being arranged on the crankshaft.

* * * * *